Sept. 30, 1969 H. HARMUTH 3,470,324

SYSTEM FOR THE TRANSMISSION OF INFORMATION BY CARRIER WAVES OVER A SINGLE CONDUCTOR

Filed Sept. 17, 1964 4 Sheets-Sheet 1

INVENTOR
Henning Harmuth

BY Bailey, Stephens & Huettig
ATTORNEYS

Sept. 30, 1969 H. HARMUTH 3,470,324

SYSTEM FOR THE TRANSMISSION OF INFORMATION BY CARRIER WAVES OVER A SINGLE CONDUCTOR

Filed Sept. 17, 1964 4 Sheets-Sheet 2

FUNCTIONS $A_i(\Theta)$

INVENTOR

Henning Harmuth

BY Bailey, Stephens & Huettig

ATTORNEYS

INVENTOR
Henning Harmuth
BY Bailey, Stephens & Huettig
ATTORNEYS

INVENTOR
Henning Harmuth
BY Bailey, Stephens & Huettig
ATTORNEYS

United States Patent Office 3,470,324
Patented Sept. 30, 1969

3,470,324

SYSTEM FOR THE TRANSMISSION OF INFORMATION BY CARRIER WAVES OVER A SINGLE CONDUCTOR

Henning Harmuth, Offenbach am Main, Germany, assignor to Battelle-Institut E.V., Frankfurt am Main, Germany Filed Sept. 17, 1964, Ser. No. 397,227
Claims priority, application Germany, Sept. 17, 1963, H 50,289
Int. Cl. H04j 1/00
U.S. Cl. 179—15 3 Claims

ABSTRACT OF THE DISCLOSURE

In the transmission by carrier waves consisting af Walsh functions a plurality of signals are produced which are divided into groups. A Walsh function is amplitude modulated by one signal of each group and another Walsh function by a different signal of each group. The modulated signals of each group are added to form multiplexed signals, and these multiplexed signals are used to amplitude modulate a different Walsh function, after which several different Walsh functions amplitude modulated by multiplexed signals are added.

The invention relates to a system for transmitting information.

In order to transmit several messages over a line or a radio link, a time- or frequencymultiplex system has been used as the carrier.

In the time-multiplex system, shown in FIG. 1, the transmitters I*g* at the transmission point are connected through a revolving transmission switch S*s* at the sending station one after another for short periods of time to a transmission line. At the receiving station, the transmission line is connected successively to the individual receivers $E_g$ by a receiver switch $E_s$ rotating in synchronism with the sending switch.

The time-multiplex system can be represented as a carrier system with time divisions, as in FIG. 1*a*. The carriers for the individual messages are represented one below the other. During the contact times of the individual signal emitters, the carrier can be represented by the value 1, since the information function $f(t)$ remains constant; outside the time of scanning the information function has the value 0, because during such periods no information is transmitted. The period of the carrier function equals the period of rotation of the switch. The number of information transmitters which can be contacted at each revolution of the switch is limited by two factors. First, each sender must have a certain minimum scanning time, because the voltage on the transmission line must be connected to this transmitter initially at the voltage value at the transmitter and, after the switching off of one transmitter and before the switching on of another, must drop back to zero. On the otherhand, during the time the switch takes to rotate, the voltage values of the various transmitters must remain substantially unchanged.

In the frequency-multiplex system, the information function normally requires within the frequency band a predetermined band width $\Delta f$. For instance, the signals of teletype machines occupy the band from 0 to 120 cycles per second. It is possible to shift the signals of several teletype machines in the voice frequency band of 300 to 3400 cycles, by modulating the individual signals to a higher frequency, in each case to one of several harmonic vibrations, which are separated from each other by 120 cycles. It is also possible to shift several such voice-freqency bands to still higher frequencies, as by taking bands of 3400 cycles width between 10 and 100 kilo-cycles.

The possibility of thus modulating the harmonic vibrations stems from the multiplication theorem of the functions cos $\omega t$ and sin $\omega t$. This is:

$$(1)\quad 2\cos\omega_0 t.\cos\omega t=\cos(\omega_0-\omega)t+\cos(\omega_0+\omega)t$$

The vibration cos $\omega t$ is transformed by modulation of the oscillation cos $\omega_0 t$ into two oscillations cos $(\omega_0-\omega)t$ and cos $(\omega_0+\omega)t$. In this way at each frequency shift the band width of the signal is doubled. In order to be able to use practicably a carrier-frequency system, this doubling must be prevented. The usual way of doing this is to use a filter, for example a band filter which will suppress cos $(\omega_0-\omega)t$.

Another system involves adding to the function (1) the function $$(2)\quad -2\sin\omega t.\sin\omega_0 t=-\cos(\omega_0-\omega)t+\cos(\omega_0+\omega)t$$

In this way also the portion cos $(\omega_0-\omega)t$ is suppressed. This second procedure requires a phase-changing filter which converts cos $\omega t$ to sin $\omega t$.

Apart from the question of weight, filters have the disadvantage of producing phase distortion. In telephone transmission this is not particularly important, because the human ear is rather tolerant to phase distortion. On the other hand, telegraphic signals such as are used in teletype or data transmitters are very sensitive to phase distortions. This means, in practice, that it is almost impossible to use the band width of a carrier frequency system with filters for telegraphic transmission.

Frequency- and time-multiplex systems are two extreme examples of more general orthogonal-multiplex systems. In a time-multiplex system any overlap of the information transmission are separated in time, while in a frequency-multiplex system any overlap of the informations are separated in transmission of the frequency band is avoided.

For the transmission of information it is also possible to use carrier, which overlap both time-wise and/or frequency-wise, insofar as they are orthogonal to each other, that is, insofar as the carrier can be received without mutual interference.

It has been found that specially good transmission characteristics can be achieved if the individual carriers consist of a periodically repeated series of rectangular pulses; the periods for the carrier starting together and being aqual in length; the carrier of order $2n$ (where $n$ is an even number, including 0) has the form as if derived from the carried of order $n$ and the carrier $2(n+1)+1$ has the form as if derived from the carrier $(n+1)$ by simply doubling the frequency of the series of rectangular pulses within each period; whereas the carrier of order $2n+1$ has the form as if derived from the carrier $n$, and the carrier $2(n+1)$ has the forms as if derived from the carrier $n+1$, by doubling the frequency of the rectangular waves in each period and reversing the amplitudes in the second half of the period. The carrier of order zero is formed by a constant direct flowing throughout the whole of the period.

These carrier waves can readily be produced by multivibrator circuits. A particular feature of the invention is that a plurality of such carriers are added and the added carriers are fed to the conductor.

Further objects and advantages of the invention can be more readily understood in consideration of the accompanying specification, especially when taken in conjunction with the accompanying drawings, which form a part thereof.

In the drawings:

FIG. 1 represents an explanation of the time-multiplex system;

FIG. 1*a* is an explantory diagram related to FIG. 1;

Figure 6:
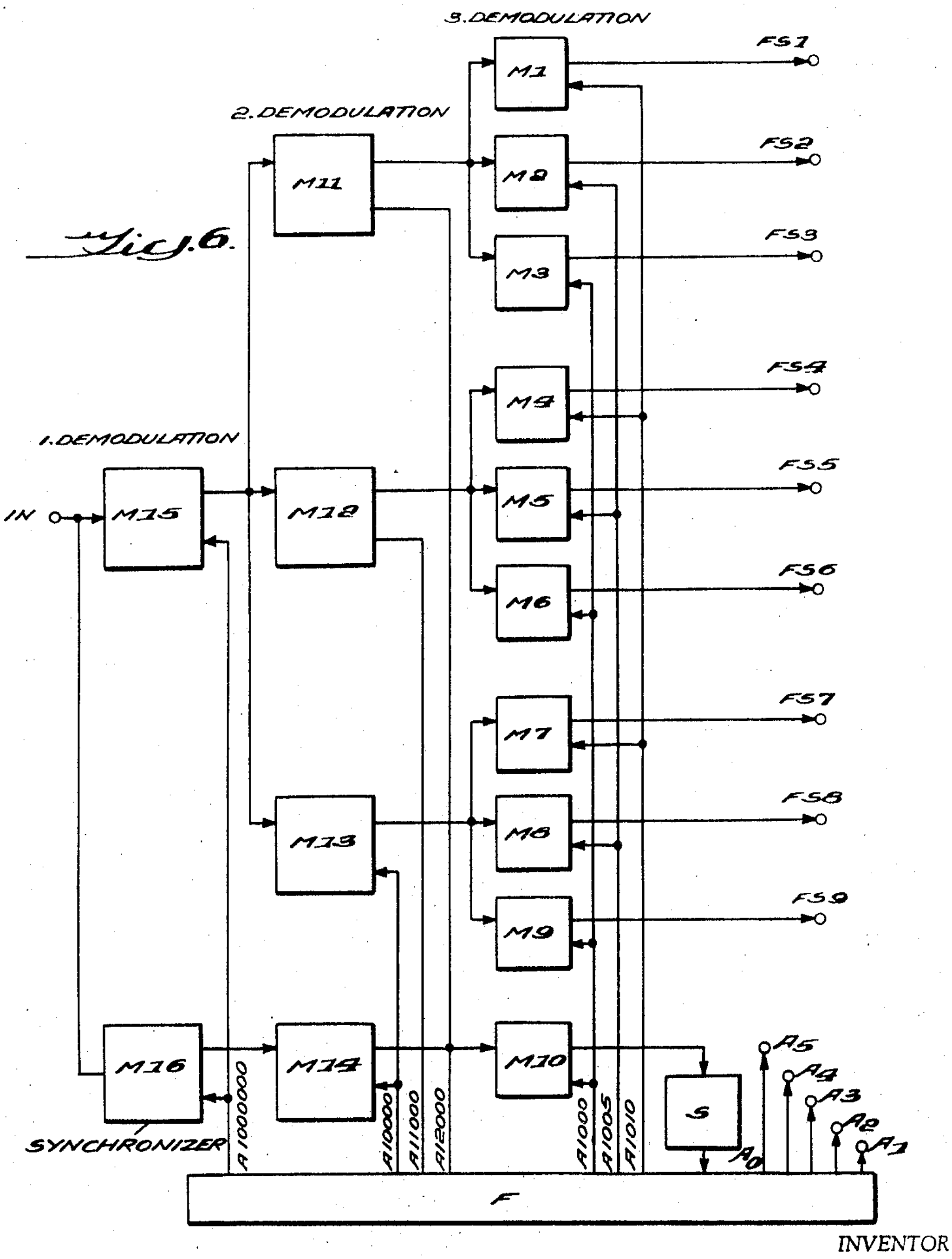

FIG. 6 the receiving side of such a system.

The carrier of order zero is formed by a current which flows constantly during the time period $\tau$. The carrier of the order 1=2.0+1 is formed from the carrier of order $n=0$ by doubling the number of rectangular impulses per period and reversing the amplitude in the second half of the period. The carrier of order 2=2.(0+1) is derived from the carrier of order 1=(0+1) by doubling the rectangular impulses and reversing the amplitude in the second half of the period.

The carrier 3=2(0+1)+1 is derived from the carrier 1 through simple doubling of the number of rectangular impulses. In the same way, carrier 4 is derived by simple doubling of the number of rectangular impulses of carrier 2.

Carrier 5=2.2+1 is derived from carrier 2, and carrier 6=2(2+1) from carrier 3 by doubling the impulses and inverting the amplitude in the second half of the period. The succeeding carriers are similarly derived. These carriers are know to the art as Walsh functions.

If the carriers—which can generally be designated $A_n(t/\tau)$— are derived in accordance with the invention, for the multiplication of two carriers of order $i$ and $k$, the multiplication theorem gives:

$$(3) \qquad A_i(t/\tau) \cdot A_k(t/\tau) = A_r(t/\tau)$$

where $i$, $k$ and $r$ are written as binary numbers, and, observing the anomaly 1+1=0 (without carry), are to be added according to the usual binary rules of addition 0+1=1+0=1; 0+0=0 (1+1=0, carry 1).

Figure 1:
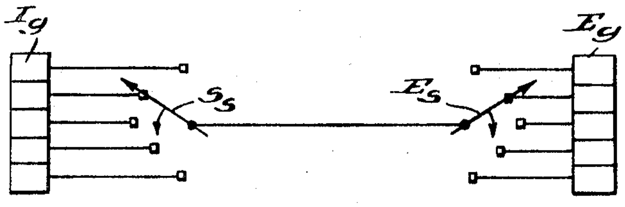
Figure 1A:
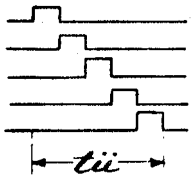
Figure 3:
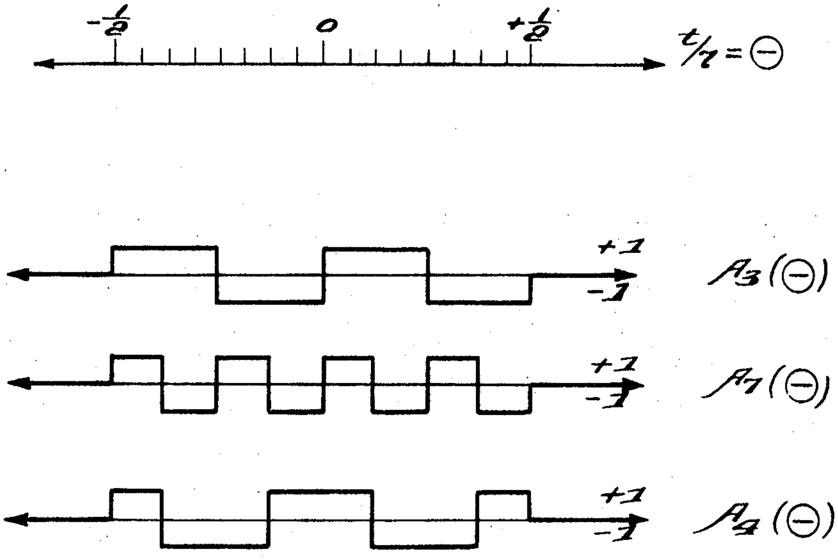
FIG. 3 shows the multiplication of two carriers $A_3(t/\tau)$ and $A_1(t/\tau)$.

On the basis of these multiplication rules the individual carriers can readily be derived through one or several multiplications of the purely periodic carriers of order 1, 3, 7 . . . $2^n-1$. As an example, in FIG. 3 the multiplication of carriers $a_3(t/\tau)$ and $A_7(t/\tau)$ is shown. The result is the carrier $A_4(t/\tau)$, according to the rules, for

3=0011
7=0111

0100=4

Carrier $A_5(t/\tau)$ is produced by superimposing carriers $A_4(t/\tau)$ and $A_1(t/\tau$, as follows:

4=0100
1=0001

0101=5

In such superimpositions, it is to be noted that for the amplitudes the multiplication rules are valid, namely +1.+1=+1;−1.−1=+1;−1.+1=+1.−1=−1.

That is, during the first and third quarters of the period, $A_3$ is positive (+1) and $A_7$ is therefore unchanged in forming $A_4$; while during the second and fourth quarters $A_3$ is negative (−1) and therefore $A_7$ is inverted in forming $A_4$.

If a carrier $A_n(t/\tau)$ is modulated at a sending station by an information function $f(t/\tau)$, so that a new function $F(t/\tau)$ results, and if the function $F(t/\tau)$ is again modulated at the receiving station with $A_n(t/\tau)$ there will be obtained at the output of the modulation stage at the receiving end the original information function $f(t/\tau)$, because $$(4) \quad A_n(t/\tau).\ A_n(t/\tau) = A_0(t/\tau) = \text{a constant} = 1$$

$$(5) \quad F(t/\tau).A_n(t/\tau) = f(t/\tau).[A_n(t/\tau)]^2 = f(t/\tau)$$

In the demodulation, no useless subsidiary terms occur as obtained by the superimposition of two harmonic carriers of equal frequency, which gives $$(6) \quad \cos \omega t . \cos \omega t = Z\tfrac{1}{2}(1 + \cos 2\omega t)$$

By the carrier system according to the invention, the signal power is fully utilized. Also, no disturbance from image frequencies occur.

Figure 4:
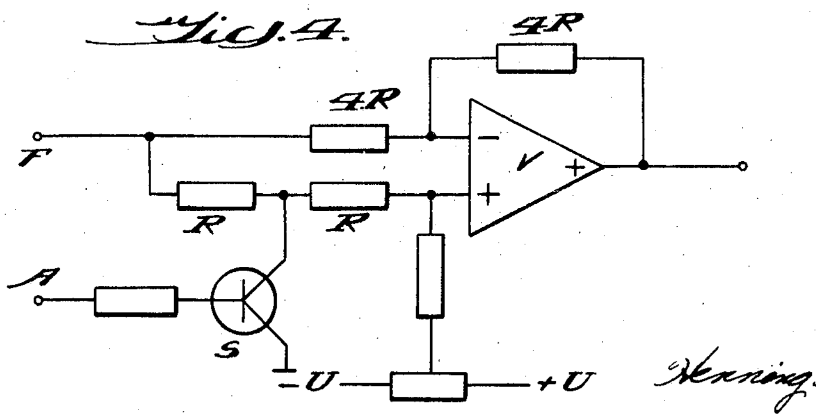
FIG. 4 shows a multiplication circuit for the multiplication of two carriers.
Figure 2:
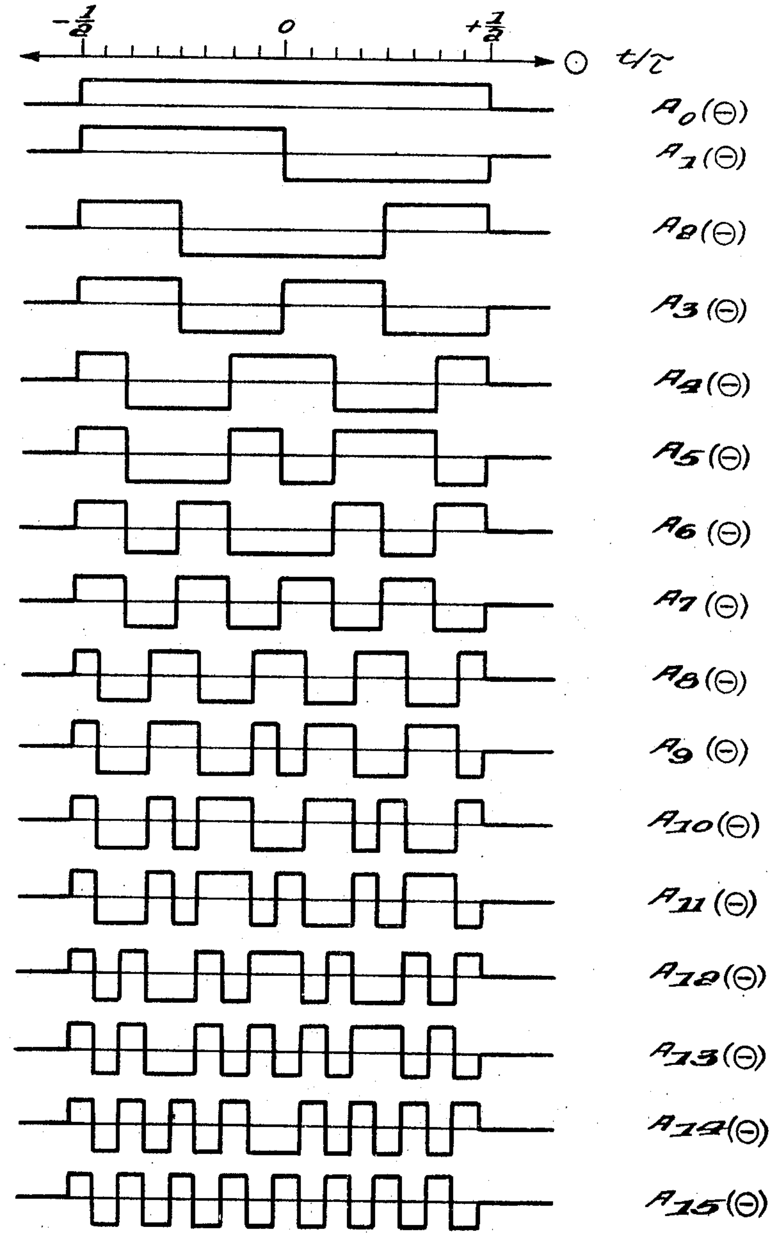
FIG. 2 shows the first sixteen carriers $A_0(t/\tau)$ to $A_{15}(t/\tau)$ of a multiplex system according to the invention.

An example of a circuit element for the superpositioning circuit is shown in FIG. 4. At the input F the selected information function $f(t/\tau)$ or the carrier $A_i(t/\tau)$ is supplied, while the input A only the carrier $A_i(t/\tau)$ is connected which can take the value constant (+)=+1 or the value constant (−)=−1.

The input line F leads through a resistance 4R to one input of a high-gain, feedback, differential amplifier V, by the use of which the input signal amplitudes are reversed, whereas it leads also across the series connection of the two resistances R to another input of the amplifier, by the use of which the input signal amplitudes are not inverted.

A transistor switch S (controlled by input A) is connencted between the midpoint of the two resistors R and ground.

V is an operational amplifier with a high degree of amplification, of a type using vacuum tubes or transistors commonly used in analog computing equipment. The amplifier has at − an inverting input and at + a non-inverting input. The carrier function is applied at the terminal A, and at the terminal F the function to modulate it. The transistor S acts as a switch. The resistances 4R have ohmic values four times those of resistances R.

Assumming that a voltage $U_1$ is applied at F, this operates as follows:

If the carrier function A is negative, the transistor S conducts. The left-hand resistance R is in parallel to the input terminal F, while the right-hand resistance R and therethrough the + input terminal of the amplifier V are at ground potential. At the right-hand output of the switching arrangement there then appears the signal −V, representing $-f(t/\tau)$, which depends only on the outer switching.

If the carrier function A is positive, the transistor S is blocked. The potential at the + input of the amplifier is twice as great as at the − input. At the output there then appears a voltage $+U_1$, representing $f(t/\tau)$.

Figure 5:
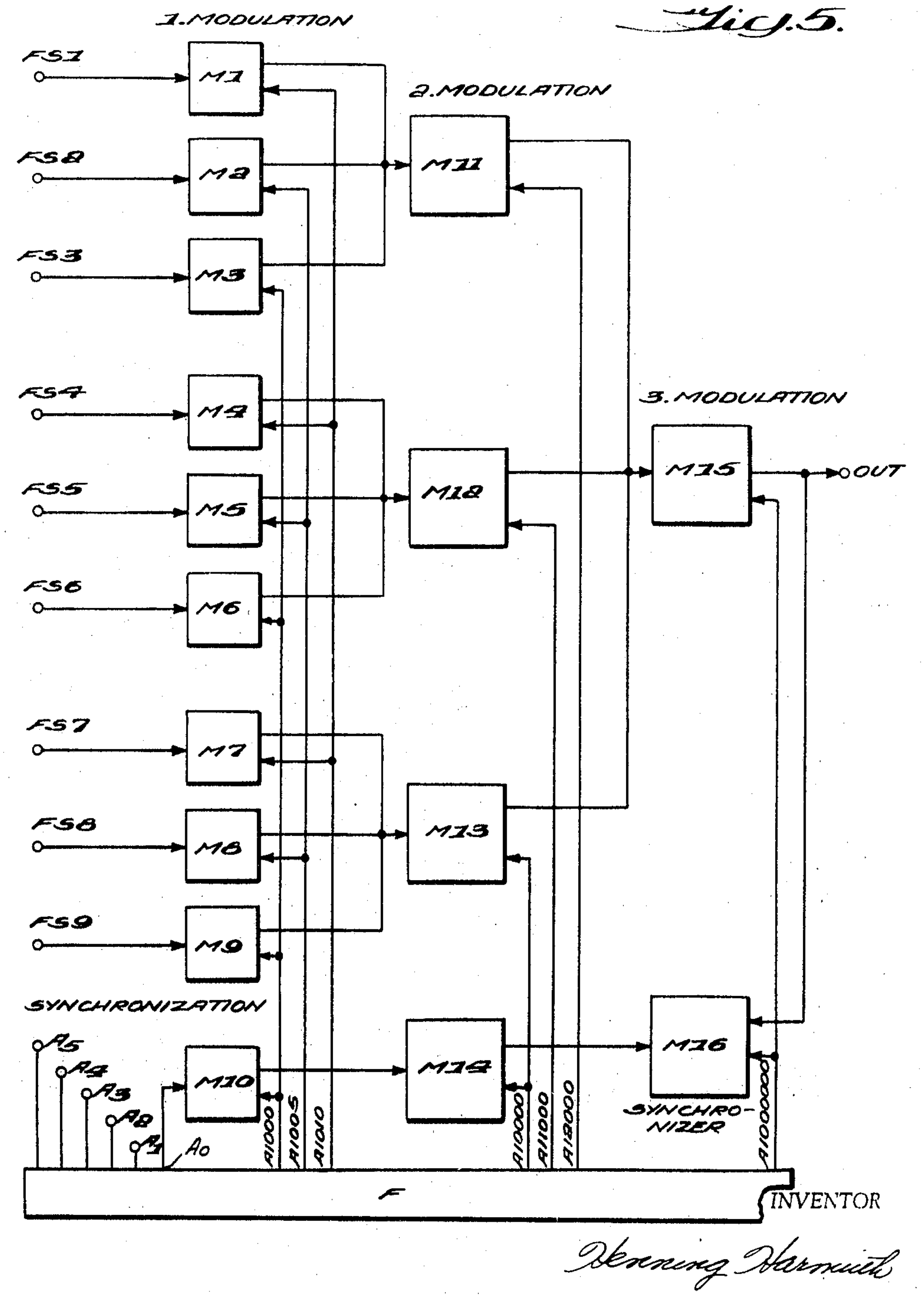
FIG. 5 shows diagrammatically the sending side of a transmission system.

FIG. 5 shows the sending side of a carrier system with functions $A_i$. It is assumed that nine teletypes are to transmit over a line. The nine teletypes are divided into three groups of three each, which amplitude-modulate the three carriers $A_{1000}$, $A_{1005}$ and $A_{1010}$ in the multiplicators $M_1$ to $M_g$. This modulated carriers of each group can be added.

F is a function generator.

The form of device shown is adapted for telephonic or teletype signals, which are sent out (or received) by FS1 to FS9. The modulator switching device shown in FIG. 4 represents the modulators $M_1$ to $M_{16}$.

By the second multiplication, the output functions of each group are superposed on one of the three carriers $A_{10,000}$ $A_{11,000}$ and $A_{12,000}$. The three resulting modulated carriers can be again added and can modulate a further carrier $A_{1,000,000}$.

Because the carriers are time-dependent functions, a synchronous control signal must be transmitted with the information. This is accomplished, e.g., by superposing carriers $A_0$, $A_{1,000}$, $A_{10,000}$ and $A_{1,000,000}$; $A_0$ having alternatingly positive and negative amplitudes.

The signal at the input can also be a telephonic signal, if a carrier function $A_i$ is selected with a sufficiently high index $i$. A higher index corresponds, sloppily speaking, to a carrier with higher frequency.

FIG. 6 shows the receiving side of the carrier system. The difference lies only in the changed input to the modulators and in the synchonization of the generator of the functions $A_i$. The similarity of construction is a consequence of the multiplication theorem.

While I have described herein one embodiment of my invention, I wish it to be understood that I do not intend to limit myself thereby except within the scope of the claims hereto or hereinafter appended.

I claim:

1. The method for the transmission of information by carrier waves, which comprises producing a plurality of signals divided into groups, amplitude modulating one Walsh function by a signal of each group and other Walsh functions by different signals of each group, adding the resulting signals of each group to form multiplexed signals, amplitude modulating different Walsh functions by each of such multiplexed signals, and adding said modulated multiplexed signals.

2. A process as claimed in claim 1 in which the sequency of the Walsh functions modulated by the multiplexed signals is greater than the sequency of the Walsh functions modulated by one signal of each group.

3. Apparatus for the transmission of information by carrier waves over a conductor or radio link of a plurality of signals divided into groups which comprises means to modulate one Walsh function by a signal of each group and other Walsh functions by different signals of each group, means to add the resultant modulated signals of each group to form multiplexed signals, means to modulate different Walsh functions by said multiplexed signals, and means to add said modulated multiplexed signals.

References Cited

UNITED STATES PATENTS 3,204,035 8/1962 Ballard et al.

RICHARD MURRAY, Primary Examiner

A. E. EDDLEMAN, Assistant Examiner